(No Model.)  2 Sheets—Sheet 1.

W. H. SMITH.
VALVE FOR STEAM ENGINES.

No. 317,870.  Patented May 12, 1885.

WITNESSES:

William H. Smith
INVENTOR
By Louis Bagger & Co
ATTORNEYS.

(No Model.) 2 Sheets—Sheet 2.
W. H. SMITH.
VALVE FOR STEAM ENGINES.
No. 317,870. Patented May 12, 1885.
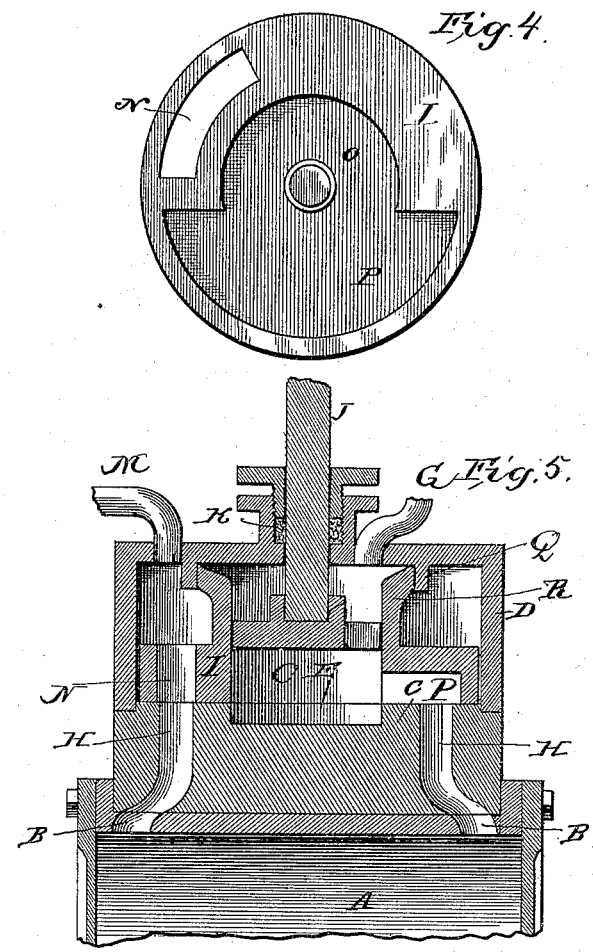
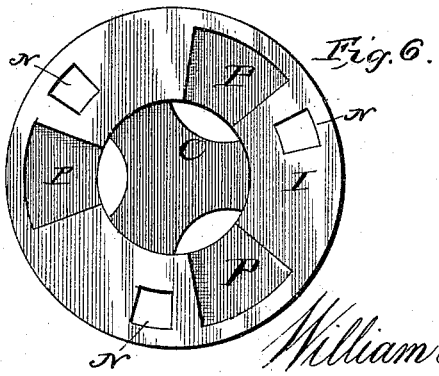
WITNESSES:
Fred. G. Dieterich
Wm. Fecher
William H. Smith,
INVENTOR.
By Louis Bagger & Co.
ATTORNEYS.

UNITED STATES PATENT OFFICE.

WILLIAM H. SMITH, OF LA CROSSE, WISCONSIN.

VALVE FOR STEAM-ENGINES.

SPECIFICATION forming part of Letters Patent No. 317,870, dated May 12, 1885.

Application filed February 26, 1885. (No model.)

*To all whom it may concern:*

Be it known that I, WILLIAM H. SMITH, a citizen of the United States, and a resident of La Crosse, in the county of La Crosse and State of Wisconsin, have invented certain new and useful Improvements in Valves for Steam-Engines; and I do hereby declare that the following is a full, clear, and exact description of the invention, which will enable others skilled in the art to which it appertains to make and use the same, reference being had to the accompanying drawings, which form a part of this specification, and in which—

Figure 1:
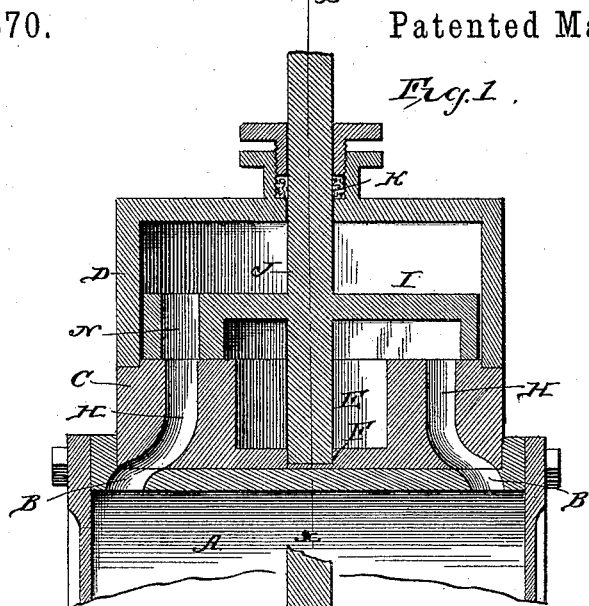
Figure 2:
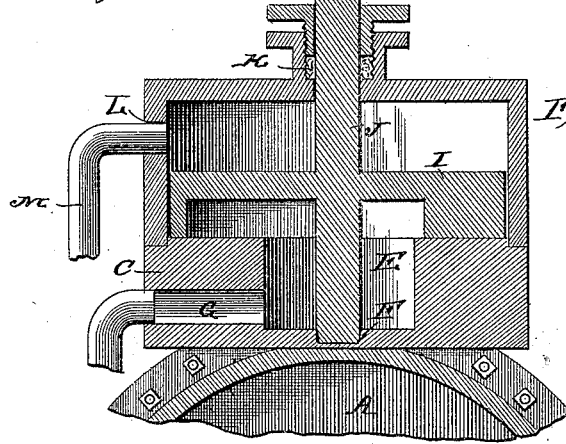
Figure 3:
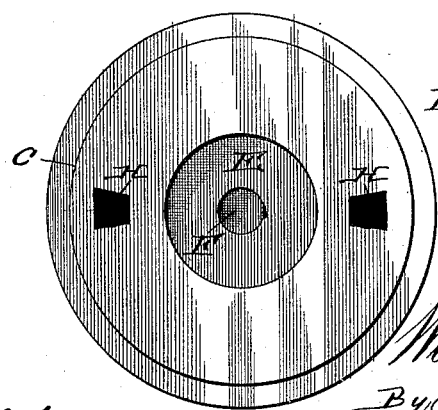

Figure 1 is a longitudinal vertical sectional view of a portion of the cylinder of a steam-engine provided with my improved rotating valve. Fig. 2 is a cross-section of the same on line *x x*, Fig. 1. Fig. 3 is a top view of the valve-seat. Fig. 4 is a bottom view of the valve. Fig. 5 is a longitudinal vertical sectional view of a portion of the cylinder of a steam-engine provided with a modified form of my valve, and Fig. 6 is a bottom view of the valve.

Similar letters of reference indicate corresponding parts in all the figures.

My invention has relation to rotating valves for steam-engines; and it consists in the improved construction and combination of parts of a valve rotating upon an axis at a right angle with the axis of the cylinder, as hereinafter more fully described and claimed.

In the accompanying drawings, the letter A indicates the cylinder, which has the usual steam-channels, B B, opening at both ends of the cylinder, and opening in the valve-seat C, which is annular and provided with a cylindrical valve-chest, D. The annular valve-seat has a central recess, E, forming a vertical bearing, F, in its center, and this recess has a laterally-extending exhaust-channel, G, opening through the side of the valve-seat and provided with a suitable exhaust-pipe. The steam-channels leading from the ends of the cylinder form steam-ports H diametrically opposite to each other and at the points of the valve-seat nearest to the extremities of the cylinder. The valve I is in the shape of a flat cylinder, bears with its under side upon the valve-seat, and turns upon a stem or shaft, J, passing through its center, and turning with its lower end in the central bearing in the exhaust-recess, and with its upper portion in a stuffing-box, K, centrally located in the top of the valve-chest, which valve-chest is provided with a live-steam port, L, opening from a live-steam pipe, M. Near the edge of the cylindrical valve is a segmental slot or perforation, N, passing through the body of the valve, and the under side of the valve has a central recess, O, registering with the central exhaust-recess in the valve-seat, and extending into a segmental recess, P, which extends from near one end of the segmental slot or perforation to a point nearly diametrically opposite to it, the recess extending over less than one-half of the lower surface of the valve.

In Figs. 5 and 6 are shown different views of a modification of the valve, and a modification of the valve-seat and steam-chest, either of which modifications may be applied to the general construction of valve or seat and chest without departing from the spirit of my invention. The top of the valve-chest is provided with an annular flange or bearing, Q, upon its under side, which seat fits around the annular top R of the valve, allowing the live steam to bear around the entire upper surface of the valve and balance the same, and the exhaust-channel G enters the top of the steam-chest instead of the valve-seat, the central recess, O, of the valve being extended through the top of the valve and communicating with the said exhaust-channel. The under side of the valve is provided with an uneven number of segmental slots extending through the valve, the said slots being lettered N, similarly to the slots in the valve only provided with one of the said slots, and at places diametrically opposite to these slots the under side of the valve is cut away to form segmental recesses, (lettered P,) similar to the corresponding recesses in the valve only having one, which recesses also communicate with the central recess. It follows that only an uneven number of segmental perforations or slots may be used for the purpose of bringing one segmental slot diametrically opposite to a segmental recess; and it will also be seen that the cut-off of the live steam may be governed by the length of the segmental slots. When steam is let into the valve-chest, and a segmental slot is brought to register with one of the ports of the steam-channels of the cylinder in the valve-seat, the steam will enter through the same into the steam-channel, and from that into the cylinder, and at the same time a segmental recess will be above the opposite port of the steam-channels, allowing the exhaust-steam to pass from the cylinder into the central recess of the valve and out through the exhaust-opening in the valve seat or chest, and by revolving the valve the piston in the cylinder will make one stroke for each set of slot and recess in the valve. Where one slot and one recess is found, it will be seen that the exhaust will continue until immediately before the steam is let into the port, which will also be seen in the valve having more than one slot and recess, so that the exhaust will be perfect, and the cut-off will be so as to allow the steam to act by expansion.

Having thus described my invention, I claim and desire to secure by Letters Patent of the United States—

The combination of a valve-seat of a steam-cylinder having diametrically-opposite steam-ports, a cylindrical valve-chest having an annular bearing or seat upon the under side of its top, and a cylindrical rotating valve having diametrically-opposite segmental slots passing through it, and segmental recesses opening into a central exhaust-recess in the valve, and having an annular flange at its top fitting in the annular bearing in the valve-chest, as and for the purpose shown and set forth.

In testimony that I claim the foregoing as my own I have hereunto affixed my signature in presence of two witnesses.

WILLIAM H. SMITH.

Witnesses:
WM. SECHER,
W. E. MCELHINNY.